(12) United States Patent
Bolinger et al.

(10) Patent No.: US 8,060,569 B2
(45) Date of Patent: Nov. 15, 2011

(54) DYNAMIC EMAIL DIRECTORY HARVEST ATTACK DETECTION AND MITIGATION

(75) Inventors: Stephen Jarrard Bolinger, Seattle, WA (US); Margaret Elisabeth Rottsolk Colville, Seattle, WA (US); Charles Francis McColgan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 11/862,972

(22) Filed: Sep. 27, 2007

(65) Prior Publication Data

US 2009/0089877 A1     Apr. 2, 2009

(51) Int. Cl.
*G06F 15/16* (2006.01)

(52) U.S. Cl. ........ 709/206; 709/223; 709/224; 709/227; 709/245; 726/22; 726/23; 726/26

(58) Field of Classification Search .......... 709/206, 709/223–224, 227, 245; 726/2–5, 22–23, 726/26
See application file for complete search history.

(56) References Cited

U.S. PATENT DOCUMENTS

| | | | | |
|---|---|---|---|---|
| 6,779,021 | B1 * | 8/2004 | Bates et al. | 709/206 |
| 6,941,348 | B2 | 9/2005 | Petry et al. | 709/206 |
| 2002/0160757 | A1 * | 10/2002 | Shavit et al. | 455/414 |
| 2004/0181581 | A1 * | 9/2004 | Kosco | 709/206 |
| 2006/0010215 | A1 * | 1/2006 | Clegg et al. | 709/206 |
| 2006/0031359 | A1 * | 2/2006 | Clegg et al. | 709/206 |
| 2006/0031483 | A1 | 2/2006 | Lund et al. | 709/224 |
| 2006/0059238 | A1 * | 3/2006 | Slater et al. | 709/206 |
| 2006/0112433 | A1 | 5/2006 | McIssac et al. | 726/26 |
| 2006/0136570 | A1 | 6/2006 | Pandya | 709/217 |
| 2006/0156017 | A1 | 7/2006 | McIssac et al. | 713/182 |
| 2006/0224750 | A1 | 10/2006 | Davies et al. | 709/229 |
| 2007/0033258 | A1 | 2/2007 | Vasilaky et al. | 709/206 |
| 2007/0050461 | A1 * | 3/2007 | Petry et al. | 709/206 |
| 2007/0156830 | A1 * | 7/2007 | Petry et al. | 709/206 |
| 2009/0064323 | A1 * | 3/2009 | Lin | 726/22 |

FOREIGN PATENT DOCUMENTS

WO    WO 2007/045049 A1    4/2007

OTHER PUBLICATIONS

Bencsáth, B. et al., "Efficient Directory Harvest Attacks", crysys.hit.bme.hu/publications/files/encsathV05ctsdha.pdf, 7 pages.
"Anti-Spam Features", Secure Messaging and Collaboration, www.kerio.com/kms_antispam.html, © 2001-2007, Kerio Technology, 2 pages.
"The Silent Killer: How Spammers are Stealing your Email Directory", www.postini.com/services/dha_wp.pdf, 2004, 5 pages.
PCT Application No. PCT/US2008/077942 : International Preliminary Report on Patentability, Mar. 30, 2010, 5 pages.
PCT Application No. PCT/US2008/077942 : International Search Report and Written Opinion of the International Searching Authority, Apr. 2, 2009, 6 pages.

* cited by examiner

*Primary Examiner* — Wing Chan
*Assistant Examiner* — Hitesh Patel
(74) *Attorney, Agent, or Firm* — Woodcock Washburn LLP

(57) ABSTRACT

Dynamic directory harvest attack detection and mitigation system is accomplished by altering the logic surrounding how a receiving email server enforces its email delivery rules. The email server's assumed response to received emails is changed when it is determined that the server is under attack, thereby foiling the unauthorized acquisition of valid email addresses and other information retained by the email server.

20 Claims, 3 Drawing Sheets

DYNAMIC EMAIL DIRECTORY HARVEST ATTACK DETECTION AND MITIGATION

TECHNICAL FIELD

The technical field relates generally to a system and method of dynamically detecting and mitigating an email directory harvest attack.

BACKGROUND

The global computer network system, known as the internet, is useful for delivering and sending messages or electronic mail (i.e., email) between users. Internet email servers are used to facilitate the transfer of email messages received from other email servers and users.

In one agreed upon email standard (such as for example, SMTP, which stands for Simple Mail Transport Protocol) the utilized email servers that comply with the standard, either accept or reject a message received from another email server.

The email server's decision to accept or reject an email message is typically driven by the email server checking the email recipient's address with a list of email addresses for which the server is configured to accept the mail. If the recipient's address is not found within such list, the server rejects the email with an associated error code to the connected client that has sent the server the email in the first place.

For operators of email servers that use a list of known users (also known as "directory services"), to determine whether or not to accept an inbound email, there exists an opportunity of a dictionary or directory harvest attack.

Dictionary attacks are an attempt by unauthorized individuals or systems to derive a list of known valid email addresses, for a particular internet domain, by analyzing the returned error codes and messages from a large plurality of rejected emails and messages. The purpose of collecting and generating this unauthorized list is for selling the list to entities that would use it for sending unsolicited emails (SPAM).

The procedure of a dictionary attack is commenced in an automatic fashion by attempting to send a single or various email messages to a large number of distinct email addressees within a given domain name. The tentative addressee names sometimes are automated and generated in sequence (for example, aa@example.com, ab@example.com) or may be generated in other patterns, including random or a pseudo-random fashion, in an effort to avoid detection.

A dynamic system for detecting and mitigating the directory harvest attack and mitigating the attack would reduce spam levels and prevent unauthorized entities from deriving known good email addresses for a particular domain.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Generally, dynamic email directory harvest attack detection and mitigation provides the ability to detect that a directory harvest attack is being waged, by analyzing and determining that a local increase of email deliveries to a particular domain is occurring, measured over a short period of time. When an attack is detected, the attack is mitigated by accepting all email messages for the domain and deleting email messages not destined to a valid user address, then allowing the malicious sender (either an individual or system) to believe that the deleted email have been delivered. In various embodiments, either a false successful email delivery notice is forwarded to the sender, or an unsuccessful delivery notice is prevented from being forwarded to the sender. Once the attack has ceased, the email server reverts to its standard operating behavior.

In another form, an email management system includes a input/output portion configured to receive an email and accept the received email for delivery to an intended recipient (if the intended recipient is determined to be a valid recipient) and a processing portion configured to determine the validity of the intended recipient of the received email; and if the intended recipient is determined to be invalid, then it processes the malicious email by determining a source of the email and deleting the email without providing a deletion notification to the source. Alternatively, an erroneous false successful delivery notice may be sent to the source.

Dynamic email directory harvest attack detection and mitigation as described herein prevents initiators of dictionary or directory harvest attacks from successfully deriving the known good email addresses for a particular domain. The system may be set to dynamically and automatically mitigate such an attack.

In an example embodiment, the dynamic email directory harvest attack detection and mitigation system dynamically turns on and off the mitigation technique, and only turns the mitigation technique on while under attack, it maintains the typical email bounce message system for all times except when its determines it is under attack.

BRIEF DESCRIPTION OF THE DRAWINGS

The foregoing summary, as well as the following detailed description, is better understood when read in conjunction with the appended drawings. For the purpose of illustrating dynamic email directory harvest attack detection and mitigation, there is shown in the drawings exemplary constructions thereof; however, dynamic email directory harvest attack detection and mitigation is not limited to the specific methods and instrumentalities disclosed.

DETAILED DESCRIPTION OF ILLUSTRATIVE EMBODIMENTS

Dynamic email directory harvest attack detection and mitigation as described herein permits dynamic detection and mitigation of dictionary or directory harvest attacks to email servers, routers, and other message passing equipment. It is known that individuals or programmed equipment may attempt to determine valid email addresses for malicious purposes upon email server equipment over which they have no authorization to control, tamper, or view.

Figure 3:
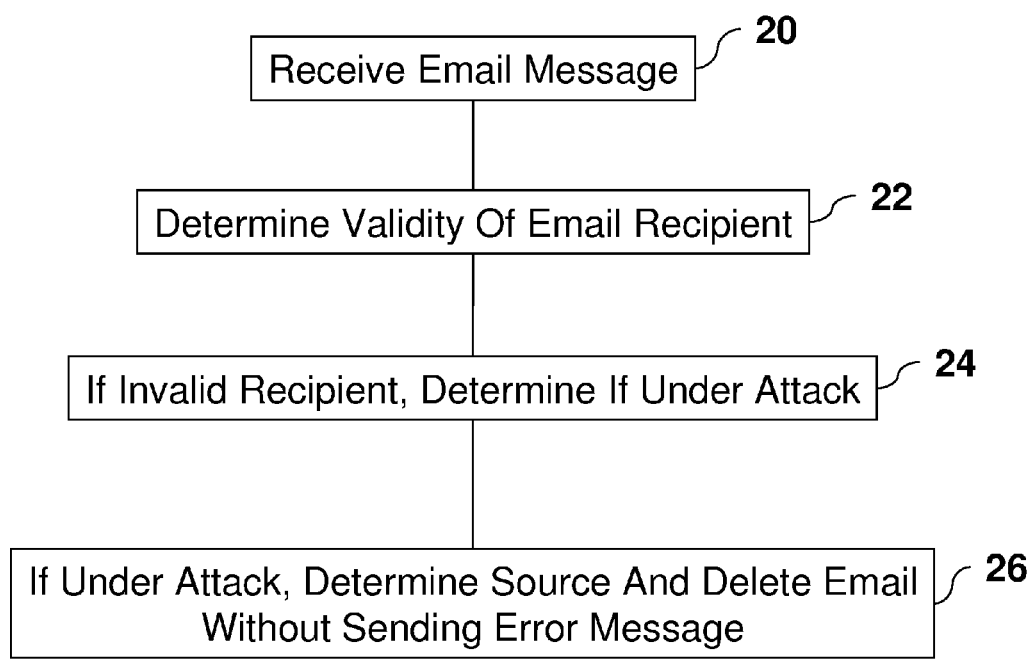
FIG. 3 is a generalized flow diagram of an example process for dynamic email directory harvest attack detection and mitigation.

In a top level general view, one form of dynamic email directory harvest attack detection and mitigation may be quickly understood by referring to FIG. 3. This form of dynamic email directory harvest attack detection and mitigation includes steps of a method that include, receiving an email message (20), determining the validity of the email recipient (22), if the recipient is invalid, determining if a directory or dictionary harvest attack is in progress (24), and if so, determining the source of the malicious email and deleting the email without sending an error message to the source of the email (26).

Traditional style email routing and other message routing may occur through the use of SMTP (Simple Mail Transport Protocol) which standard includes message routing based on a recipient address. As utilized in email servers or routers that comply with that standard, either the servers or routers accept or reject a message received from another email server. In the SMTP standard, if an email message is found to be rejectable, for instance through an error in the address or other error, an error message is created and sent back to the source of the received email.

In making the decision to accept or reject email, the email server often checks the email recipient's address with a list of email addresses for which the server is configured to accept mail. If the recipient's address is not found within the list, the server rejects the email with an associated error code to the connected source or client.

In accordance with an example embodiment of dynamic email directory harvest attack detection and mitigation, directory harvest attack attempts are detected by comparing the number of unique recipients of a given domain to which a delivery was attempted over a given period of time with the total number of unique valid email addresses for a given domain. If the number of attempts to distinct addresses in the domain is significantly larger than the total number of valid email addresses for a given domain, it is indicative of a directory attack.

For instance, if "example.com" domain has 500 valid email addresses, and an email server configured to accept email for "example.com" receives attempts to deliver email to over 1000 unique email addresses at the "example.com" domain over a 2 minute period, it indicates that a directory attack is taking place.

The total number of unique email addresses will be variable for different domains, which would likewise cause a change to the set threshold number or time period in which to watch, log, and record inbound email message sending attempts for each of the domains maintained by the email server. For clarity, an email server may route emails for one or more domains.

Additionally, alternate variables may be monitored and thresholds changed, to determine an attack is underway, such as common but invalid email addresses, sequential or alphabetically in order addressees, or other patterns that may be discovered over time, including non-sequential or pseudorandom patterns of the addressee names, times of email receipt, and sources or clients of the inbound email, as well as others. Further, different relationships may be computed and respective threshold levels utilized, to determine if an attack is occurring, such as determining the ratio or percentage of invalid email receipts compared to the total number of valid email addresses in the domain. Many various metrics may also be utilized to determine if an attack is occurring.

Additionally, as the number of valid email addresses for a particular domain may change over time, the likewise threshold numbers may also respectively change. By having the various detection thresholds utilized able to be changed automatically based on a change of state of the watched domain (for example the number of valid email addresses), the inventive system thereby becomes dynamic in its potential response to an attack. Other attributes of the domain could also change over time, necessitating a respective automatic change in the detection threshold levels or numbers.

The mitigation technique in response to the directory harvest or dictionary attack, may be accomplished by altering the logic surrounding how the receiving email server enforces its delivery rules. For example, the email server's response to received emails is altered when it determines it is under attack.

Specifically, the email server will be reconfigured to accept all email for the domain under attack. The method then will return a standard result code to the sender indicating a successful delivery. After accepting the mail, the receiving mail server will look up the recipient email address in its list or directory of valid email addresses for the domain. If the address is in the list of valid addresses, the email is delivered as usual; if not, the email is destroyed without any notification to the sender.

This mitigation method is only employed while the dictionary attack continues. Once the attack ceases, the email server reverts to its original state of accepting mail for known good users and rejecting mail for all others for a respective domain. This automatic turn on and automatic turn off of the mitigation technique creates a dynamic and robust method of rendering the attacks worthless for their malicious purposes.

Figure 1:
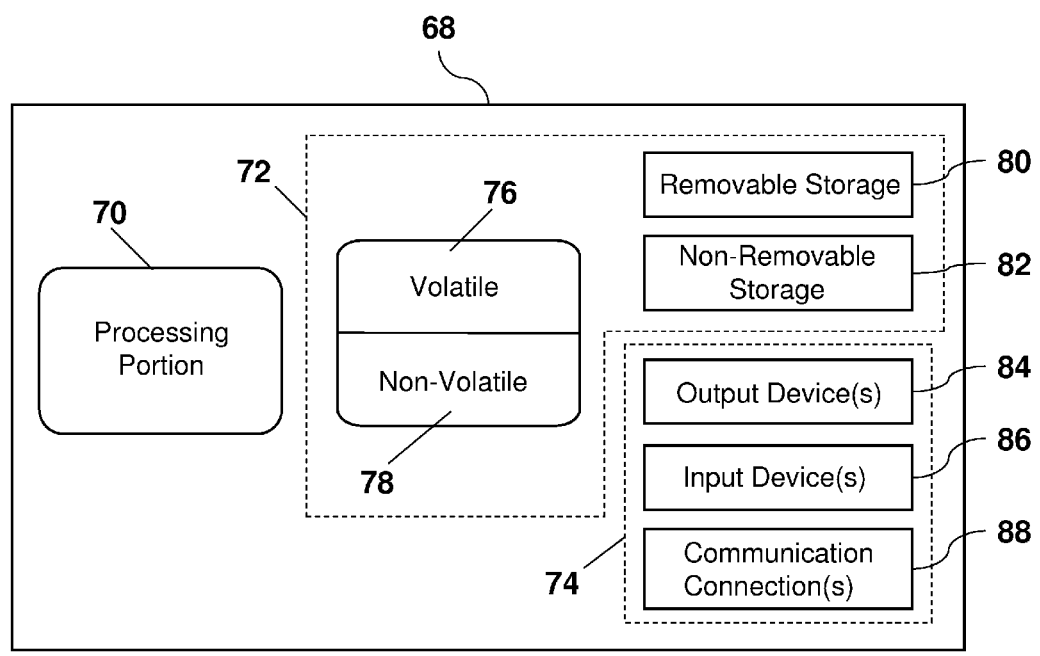
FIG. 1 is a block diagram of an example processor for implementing dynamic email directory harvest attack detection and mitigation.

FIG. 1 is a diagram of an exemplary processor 68 for implementing dynamic email directory harvest attack detection and mitigation. The processor 68 comprises a processing portion 70, a memory portion 72, and an input/output portion 74. The processing portion 70, memory portion 72, and input/output portion 74 are coupled together (coupling not shown in FIG. 1) to allow communications therebetween. The input/output portion 74 is capable of providing and/or receiving components utilized to perform dynamic email directory harvest attack detection and mitigation as described above. For example, the input/output portion 74 is capable of, as described above, providing/receiving email messages and transmitting error messages, and transmitting standard result codes indicative of successful email delivery, or a combination thereof. Further, the input/output portion can forward the received email messages to the intended recipients, and/or accept the email for delivery to the intended recipients, if the recipients are determined to be valid.

The processing portion 70 is capable of implementing dynamic email directory harvest attack detection and mitigation as described above. For example, the processing portion 70 is capable of determining when a directory harvest attack is occurring, changing its policy of accepting or rejecting email messages, changing its policy on accepting or rejecting email messages when the directory harvest attack is no longer occurring. Further it can compute, alter and determine various dynamic thresholds which create the criteria for determining attack detection as described above. Additionally, the processing portion can, when the intended recipient is determined to be invalid, determine the source of the malicious email, determine that a malicious attack campaign is under way, and deleting the email without providing or causing a deletion notification to the source. In combination with the input/output portion, the processor can determine the standard result code to forward to the email source. During attack mitigation, it can give the source an erroneous impression that the malicious email received had been delivered.

The processor 68 can be implemented as a client processor and/or a server processor. In a basic configuration, the processor 68 can include at least one processing portion 70 and memory portion 72. The memory portion 72 can store any information utilized in conjunction with implementing dynamic email directory harvest attack detection and mitigation as described above. Depending upon the exact configuration and type of processor, the memory portion 72 can be volatile (such as RAM) 76, non-volatile (such as ROM, flash memory, etc.) 78, or a combination thereof. The processor 68 can have additional features/functionality. For example, the processor 68 can include additional storage (removable storage 80 and/or non-removable storage 82) including, but not limited to, magnetic or optical disks, tape, flash, smart cards or a combination thereof. Computer storage media, such as memory portion 72, 76, 78, 80, and 82, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 68. Any such computer storage media can be part of the processor 68.

The processor 68 can also contain communications connection(s) 88 that allow the processor 68 to communicate with other devices, such as other devices, for example. Communications connection(s) 88 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 68 also can have input device(s) 86 such as keyboard, mouse, pen, voice input device, touch input device, etc. Output device(s) 84 such as a display, speakers, printer, etc. also can be included.

Figure 2:
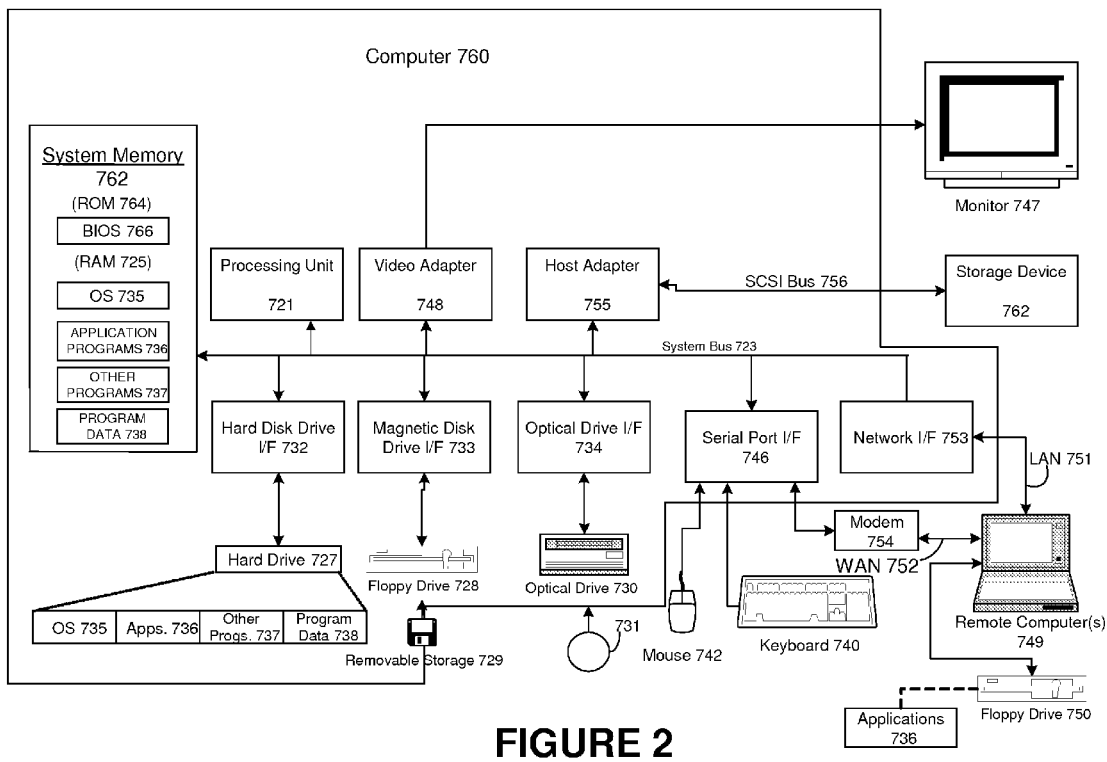
FIG. 2 is a depiction of a suitable computing environment in which customer can be implemented.

FIG. 2 and the following discussion provide a brief general description of a suitable computing environment in which dynamic email directory harvest attack detection and mitigation can be implemented. Although not required, various aspects of dynamic email directory harvest attack detection and mitigation can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of dynamic email directory harvest attack detection and mitigation can be practiced with other computer system configurations, including hand held devices, multi processor systems, microprocessor based or programmable consumer electronics, network PCs, minicomputers, mainframe computers, and the like. Further, dynamic email directory harvest attack detection and mitigation also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with dynamic email directory harvest attack detection and mitigation as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 2, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 2 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 2. The logical connections depicted in FIG. 2 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of dynamic email directory harvest attack detection and mitigation are particularly well-suited for computerized systems, nothing in this document is intended to limit dynamic email directory harvest attack detection and mitigation to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for dynamic email directory harvest attack detection and mitigation, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing dynamic email directory harvest attack detection and mitigation.

The program(s) can be implemented in assembly or machine language, if desired. In any case, the language can be a compiled or interpreted language, and combined with hardware implementations. The methods and apparatuses for implementing dynamic email directory harvest attack detection and mitigation also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of dynamic email directory harvest attack detection and mitigation. Additionally, any storage techniques used in connection with dynamic email directory harvest attack detection and mitigation can invariably be a combination of hardware and software.

While dynamic email directory harvest attack detection and mitigation has been described in connection with the example embodiments of the various figures, it is to be understood that other similar embodiments can be used or modifications and additions can be made to the described embodiments for performing the same functions of dynamic email directory harvest attack detection and mitigation without deviating therefrom. Therefore, dynamic email directory harvest attack detection and mitigation as described herein should not be limited to any single embodiment, but rather should be construed in breadth and scope in accordance with the appended claims.

What is claimed:

1. An email management system comprising:
an input/output portion that receives an email; and
a processing unit that:
determines the validity of the intended recipient of the received email; and
if the intended recipient is determined to be valid:
forwards the received email to the intended recipient, through the input/output portion; and
if the intended recipient is determined to be invalid:
determines if the received email is part of a malicious campaign directed at a given domain, the determination comprising:
comparing a number of unique email addresses to which delivery of email was attempted in the given domain over a given period of time, with the total number of valid email addresses that are known to exist in the given domain; and
if the number of unique email addresses exceeds a total number of valid email addresses by a threshold value, deleting the email without providing a deletion notification to a sender of the email.

2. The email management system of claim 1 wherein the input/output portion is configured to accept a plurality of emails with a respective plurality of intended recipients.

3. The email management system of claim 1, wherein: the processing unit provides a delivery notice of successful delivery of the email; and the input/output portion transmits the delivery notice to the sender of the email for giving the sender the impression that the email was delivered to the intended recipient.

4. The email management system of claim 1 wherein the received email is part of a dictionary attack.

5. The email management system of claim 1, wherein the processing unit is further configured to determine that the received email is part of a malicious campaign by determining if the number of unique recipients of a given domain to which delivery of the received email was attempted over a given period of time is over a predetermined number.

6. The email management system of claim 1, wherein the processing unit determines that the received email is part of a malicious campaign if the percentage of unique recipients is over a predetermined number.

7. The email management system of claim 1 wherein the processing unit turns on a directory harvest mitigation technique if a malicious campaign is detected; and turns off the directory harvest mitigation technique if no malicious campaign is detected.

8. An email management method comprising:
receiving an email;
determining a validity of an intended recipient of the received email;
if the intended recipient is determined to be valid, forwarding the email to the intended recipient; and
if the intended recipient is determined to be invalid:
determine if the received email is part of a malicious campaign based on a percentage of invalid email addresses present in the received email to a total number of valid email addresses of a given domain to which delivery of the received email was attempted over a given period of time;
determining a source of the email; and
deleting the email without providing a deletion notification to the source, as a part of a directory harvesting mitigation technique.

9. The method of claim 8 further comprising receiving a plurality of emails with a respective plurality of intended recipients.

10. The method of claim 8 further comprising sending a delivery notice to the source of the email for giving the source the impression that the email was delivered to the intended recipient.

11. The method of claim 8 further comprising determining that the received email is part of a malicious campaign by determining if the number of unique recipients of a given domain to which delivery of the received email was attempted over a given period of time, is over a predetermined number.

12. The method of claim 8 further comprising determining that the received email is part of a malicious campaign if the percentage of unique recipients is over a predetermined number.

13. The method of claim 8 further comprising:
activating the mitigation technique if a malicious campaign is detected; and
turning off the mitigation technique if no malicious campaign is detected.

14. A computer-readable storage medium that is not a signal and that comprises computer-executable instruction for managing email by performing the steps of:
receiving an email;
determining a validity of an intended recipient of the received email;
if the intended recipient is determined to be valid, forwarding the email to the intended recipient; and
if the intended recipient is determined to be invalid:
determining if the received email is part of a malicious campaign directed at a given domain, the determination comprising comparing the number of unique email addresses to which delivery of email was attempted in the given domain over a given period of time, with the total number of valid email addresses that are known to exist in the given domain; and
if the number of unique email addresses exceeds the total number of valid email addresses by a threshold value, deleting the email without providing a deletion notification to a sender of the email, thereby forming a directory harvest mitigation technique.

15. The computer-readable storage medium of claim 14, wherein a plurality of emails are forwarded to a respective plurality of intended recipients.

16. The computer-readable storage medium of claim 14, the computer-executable instructions further for sending a delivery notice to the source of the email for giving the source the impression that the malicious email was delivered to the intended recipient.

17. The computer-readable storage medium of claim 14 wherein the received email is part of a dictionary attack.

18. The computer-readable storage medium of claim 14, the computer-executable instructions further for determining that a directory harvest attack is occurring.

19. The computer-readable storage medium of claim 14, the computer-executable instructions further for determining that the received email is part of a malicious campaign by determining if the number of unique recipients of a given domain to which delivery of the received email was attempted over a given period of time, is over a predetermined number.

20. The computer-readable storage medium of claim 14, the computer-executable instructions further for determining that the received email is part of a malicious campaign if the percentage of unique recipients is over a predetermined number.

* * * * *